United States Patent
Chen et al.

(10) Patent No.: US 9,993,384 B1
(45) Date of Patent: Jun. 12, 2018

(54) VISION-ASSIST SYSTEMS AND METHODS FOR ASSISTING VISUALLY IMPAIRED USERS WITH NAVIGATING AN ENVIRONMENT USING SIMULTANEOUS AUDIO OUTPUTS

(71) Applicant: Toyota Motor Engineering & Manufacturing North America, Inc., Erlanger, KY (US)

(72) Inventors: Tiffany Chen, San Jose, CA (US); Robert Francis Tow, Los Gatos, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/619,795

(22) Filed: Jun. 12, 2017

(51) Int. Cl.
| | |
|---|---|
| G01C 21/00 | (2006.01) |
| A61H 3/06 | (2006.01) |
| G01C 21/36 | (2006.01) |
| G01C 21/20 | (2006.01) |
| G01S 1/08 | (2006.01) |
| G06F 3/16 | (2006.01) |

(52) U.S. Cl.
CPC ............ *A61H 3/061* (2013.01); *G01C 21/20* (2013.01); *G01C 21/3629* (2013.01); *G01S 1/08* (2013.01); *G06F 3/16* (2013.01); *A61H 2201/1609* (2013.01)

(58) Field of Classification Search
CPC .. G05D 1/0246; G05D 1/0278; G05D 1/0274; B60W 30/06; G06K 9/00812; G06K 9/6212; G01S 19/13
See application file for complete search history.

(56) References Cited

U.S. PATENT DOCUMENTS

| | | |
|---|---|---|
| 9,140,554 B2 | 9/2015 | Jerauld |
| 9,201,143 B2 | 12/2015 | Slamka |
| 9,316,502 B2 | 4/2016 | Moore et al. |

(Continued)

FOREIGN PATENT DOCUMENTS

JP  2008256419 A  10/2008

OTHER PUBLICATIONS

Smith, Dana, "Blind Sight: The Next Generation of Sensory Substitution Technology", The Crux, Discover Magazine, Apr. 28, 2014.

*Primary Examiner* — Hussein Elchanti
(74) *Attorney, Agent, or Firm* — Dinsmore & Shohl LLP

(57) ABSTRACT

A system and method for assisting a visually impaired user with navigating an environment. The system and method include determining a first navigational path to a first target destination and a second navigational path to a second target destination and providing the user with directional information in the form a first audio output associated with the first target destination and a second audio output associated with the second target destination. The system and method vary an audio characteristic of the first audio output in relation to the current orientation of the user with respect to the first navigational path and vary an audio characteristic of the second audio output in relation to the current orientation of the user with respect to the second navigational path. The system and method control the audio output unit to simultaneously output the first audio output and the second audio output.

20 Claims, 6 Drawing Sheets

(56) References Cited

U.S. PATENT DOCUMENTS

| | | | |
|---|---|---|---|
| 9,578,307 B2* | 2/2017 | Moore | H04N 13/0239 |
| 9,677,901 B2* | 6/2017 | Yamamoto | G01C 21/3655 |
| 2006/0129308 A1 | 6/2006 | Kates | |
| 2009/0032590 A1* | 2/2009 | Hopkins | A61H 3/061 |
| | | | 235/385 |
| 2009/0157583 A1* | 6/2009 | Couckuyt | G06Q 30/02 |
| | | | 706/46 |
| 2009/0201176 A1* | 8/2009 | Shimada | G01C 21/20 |
| | | | 340/944 |
| 2011/0037560 A1* | 2/2011 | Belloteau | A61H 3/061 |
| | | | 340/4.1 |
| 2013/0191246 A1 | 7/2013 | Calman et al. | |
| 2015/0196101 A1 | 7/2015 | Dayal et al. | |
| 2016/0033280 A1 | 2/2016 | Moore et al. | |
| 2016/0078278 A1 | 3/2016 | Moore et al. | |
| 2016/0327405 A1* | 11/2016 | Kim | G06F 19/3481 |
| 2017/0245081 A1* | 8/2017 | Lyren | H04S 1/005 |

* cited by examiner

VISION-ASSIST SYSTEMS AND METHODS FOR ASSISTING VISUALLY IMPAIRED USERS WITH NAVIGATING AN ENVIRONMENT USING SIMULTANEOUS AUDIO OUTPUTS

TECHNICAL FIELD

The present specification generally relates to vision-assist systems and methods for assisting a visually impaired user and, more specifically, vision-assist systems and methods that assist the user with navigating an environment to different target locations using simultaneous audio outputs.

BACKGROUND

Blind or visually impaired persons have difficulty navigating within their environment because of their inability to detect the location of target destinations and determine a navigational path to the target destinations. Blind or visually impaired persons often use computer-based vision systems to detect target destinations within an environment using one or more algorithms, and guide the blind or visually impaired user along the navigational path to the target destination. Such devices use spoken or audio prompts to indicate when to turn and to what degree. For example, such devices would identify to the user to turn left by 90 degrees using either a voice prompt, such as a clock face identification (e.g. 9 o'clock), or a specific beep to indict a 90 degree left turn.

Such devices have proven useful for assisting a blind or visually impaired user to navigate to the target destination when the person completes the required degree of the turn correctly and when there is a sufficient space of time between turns. However, if the blind or visually impaired person incorrectly executes the prompted turn, for example turned left by 65 degrees rather than the required 90 degrees, the previously known devices would be required to issue a course correction prompt. In situations in which the next navigational turn is rapidly approaching, the user could be confused by the course correction prompt followed by the subsequent navigation prompt. In other situations, the user can complete a first navigation prompt and be required to execute a second navigational prompt turn; however, the previously known device is still outputting the first navigation prompt. Therefore, the user would be prevented from moving naturally, specifically, the user would be required to move slower than normal to prevent outpacing the directional information.

As the previously known devices utilize intermittent voice prompts or turn indicating beeps, it is difficult for a user to navigate to two different target locations. Specifically, a user is incapable of accurately following a navigational path to a target destination while simultaneously receiving navigational information to a second different target destination. Therefore, the user may fail to realize the effect of following the navigational path to the target destination on the navigational path to the second target destination. Specifically, the user would fail to maintain the spatial orientation of the two navigational paths to the two target destinations based on the user's current location and path.

Accordingly, a need exists for alternative systems and methods for assisting a blind or visually impaired user with navigating an environment to different target locations using simultaneous audio outputs.

SUMMARY

In one embodiment a vision-assist system for assisting a visually impaired user with navigating an environment includes a location sensor, an audio output unit, and an electronic control unit. The location sensor provides a current location and current orientation of the user. The audio output unit provides an audio output to the user. The electronic control unit includes a processor and a memory unit that is coupled to the processor. The memory unit stores logic that, when executed by the processor, causes the electronic control unit to determine a first navigational path to a first target destination and a second navigational path to a second target destination in response to an identification of the first target destination and the second target destination of the user. The electronic control unit also provides the user with directional information in the form a first audio output associated with the first target destination and a second audio output associated with the second target destination. The electronic control unit further varies an audio characteristic of the first audio output in relation to the current orientation of the user with respect to the first navigational path and varies an audio characteristic of the second audio output in relation to the current orientation of the user with respect to the second navigational path. The electronic control unit also controls the audio output unit to simultaneously output the first audio output and the second audio output.

In another embodiment, a method for assisting a visually impaired user with navigating the environment includes determining a current location of the user and a current orientation of the user and setting a first target destination and a second target destination of the user. The method further includes determining a first navigational path to the first target destination and a second navigational path to the second target destination. The method also includes providing the user with directional information in the form a first audio output associated with the first target destination and a second audio output associated with the second target destination. The method further includes varying an audio characteristic of the first audio output in relation to the current orientation of the user with respect to the first navigational path and varying an audio characteristic of the second audio output in relation to the current orientation of the user with respect to the second navigational path. The method outputs the first audio output and the second audio output simultaneously.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein are directed to vision-assist systems and related methods that provide directional information to a visually impaired user. Generally, embodiments described herein may be configured as systems or devices that provide directional information to a first target destination and a second target destination by simultaneously outputting a first audio output and a second audio output. The embodiments disclosed herein vary an audio characteristic of the first audio output in relation to a current orientation of the user with respect to a first navigational path to the first target destination. The embodiments described herein also vary an audio characteristic of the second audio output in relation to the current orientation of the user with respect to a second navigational path to the second target destination.

The embodiments disclosed herein provide simultaneous directional information to the first target destination and the second target destination based on the current orientation of the user with respect to the first navigational path and the second navigational path. In the embodiments disclosed herein, the first audio output and the second audio output are provided in continuous manner to provide the user with continuous directional information. Further, in the embodiments disclosed herein, the audio characteristic of the first audio output and the audio characteristic of the second audio output are continuously varied based on the current orientation of the user. Specifically, the user is provided with continuously updated navigational information simultaneously to the first target destination and the second target destination.

By providing continuous directional information, the user is continuously updated on a navigational path to the target destination. Further, the continuous directional information allows the user to determine whether the user is correctly oriented with respect to the navigational path. Further still, by providing simultaneous directional information to a first target destination and a second target destination, the user can monitor their position and current orientation with respect to both the first target destination and the second target destination. Various embodiments of vision-assist system and methods for adjusting vision-assist system will be described in more detail below.

Figure 1:
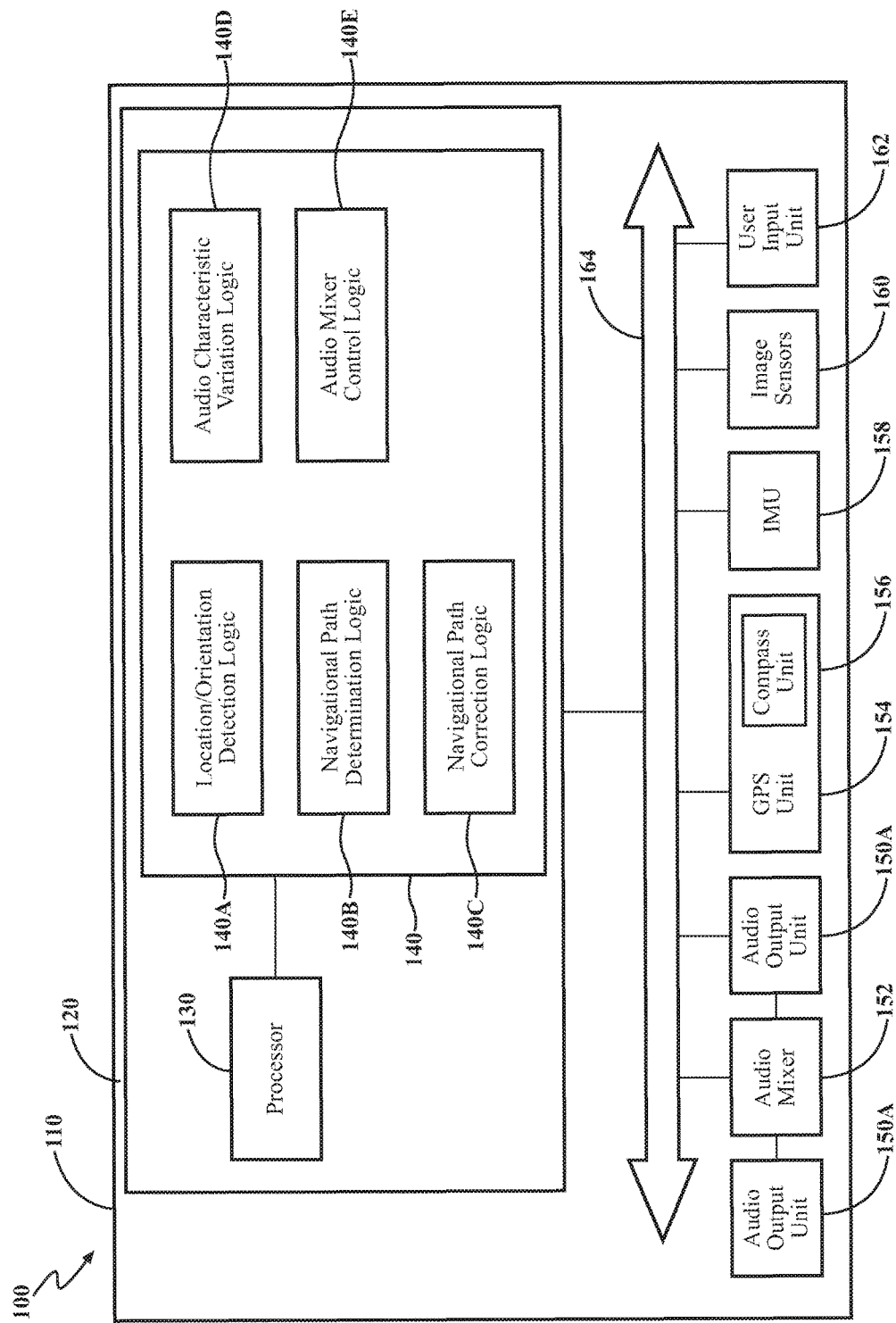
FIG. 1 schematically depicts an environment for a vision-assist system for assisting a visually impaired user with navigating an environment, according to one or more embodiments shown and described herein.

Referring now to FIG. 1, components of an example vision-assist system 100 is schematically depicted. The vision-assist system 100 comprises a housing 110 in or on which internal components are disposed, such as an electronic control unit (ECU) 120 having one or more processors 130 and one or more memory components 140, a first audio output unit 150A, a second audio output unit 150B, one or more audio mixers 152, one or more global positioning system (GPS) units 154, one or more compass units 156, one or more inertial measurement units 158, one or more image sensors 160, and one or more user input units 162. As described in more detail below, the housing 110 may take on any configuration and, in some embodiments, may be configured to be worn by the user, thereby freeing the user's hands as he or she operates the vision-assist system 100.

The processor 130 may include any processing component configured to receive information and execute instructions (such as from the memory component 140). Example processing components include, but are not limited to, one or more general purpose processors, microcontrollers, and/or application-specific integrated circuits.

The memory component 140 is coupled to the processor 130 and stores computer-readable instructions. The memory component 140 may be configured as volatile and/or non-volatile non-transitory computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 140 may be configured to store, among other things, operation logic, object recognition logic, and auditory message generation logic, as described in more detail below. The memory component 140 may also store data, such as image data captured by the one or more image sensors, externally acquired image data, or local map data for navigating local environments. The memory component 140 operate as the memory unit of the electronic control unit 120.

A local interface 164 is also included in the embodiment depicted by FIG. 1, and may be implemented as a bus or other interface to facilitate communication among the components of the vision-assist system 100. Although not depicted in FIG. 1, the vision-assist system 100 may also include one or more network interface modules to connect the vision-assist system 100 to a remote computing device or a remote computer network. The network interface module may include any wired or wireless networking hardware, such as a modem, LAN port, wireless fidelity (Wi-Fi) card, WiMax card, mobile communications hardware, and/or other hardware for communicating with other networks and/or devices.

The first audio output unit 150A and the second audio output unit 150B may be configured as speakers capable of receiving auditory signals from the processor 130 (either directly or indirectly from other hardware, such as amplifiers, drivers, digital-to-analog converts, and the like) to produce an auditory message capable of being heard by the user. In some embodiments, the first audio output unit 150A and the second audio output unit 150B include a first speaker and a second speaker, respectively, so that the auditory message is provided to the user in stereo. The first audio output unit 150A and the second audio output unit 150B may be configured to convey directional information on a both a first navigational path to a first target destination and a second navigational path to a second target destination.

In some embodiments, the first and second audio output units 150A, 150B may provide auditory messages such as menu navigation options to the user so that the user may program or otherwise set parameters of the vision-assist system 100. Auditory messages also include environmental information, as described in detail below. Although two audio devices are illustrated, more or fewer audio devices may be provided. In some embodiments, a microphone is also provided as a user-input device to enable voice-control of the vision-assist system 100. In this manner, the user may provide feedback to the vision-assist system 100 using voice commands. As an example and not a limitation, the first audio output unit 150A and/or the second audio output unit 150B may be configured as a combination speaker/microphone device capable of both receiving voice commands and emitting auditory messages/sounds.

The audio mixer 152 is coupled to the first and second audio output units 150A, 150B. The audio mixer 152 cooperates with the processor 130 of the electronic control unit 120 and may be configured to mix a first audio output and a second audio output, as described in more detail below.

The GPS unit 154 cooperates with the processor 130 of the electronic control unit 120. The GPS unit 154 determines a current location of the vision-assist system 100 based on local map data stored in the GPS unit 154. The current location of the vision-assist system 100 is equated as the current location of the user. The GPS unit 154 is communicatively coupled to the processor 130 such that it provides current location information of the vision-assist system 100 to the processor 130. In some embodiments, local map data used by the GPS unit 154 in determining the current location of the user is stored directly within the memory component 140.

The GPS unit 154 may include the compass unit 156. The compass unit 156 cooperates with the processor 130 of the electronic control unit 120. The compass unit 156 determines a current orientation of the vision-assist system 100. The current orientation of the vision-assist system 100 is equated as the current orientation of the user. The compass unit 156 is communicatively coupled to the processor 130 such that it provide current orientation information of the vision-assist system 100 to the processor 130.

In some embodiments, the vision-assist system 100 may be configured to receive local map data that is used by the GPS unit 154 to determine the current location and/or current orientation of the user. Specifically, upon entering a building, such as a mall, the vision-assist system 100 is provided with local map data in a form of a downloadable map. The GPS unit 154 utilizes the local map data and the compass unit 156 to determine the current location and current orientation of the user.

The inertial measurement unit 158 may be configured to acquire the information with respect to the current orientation of the vision-assist system 100. The inertial measurement unit 158 is communicatively coupled to the processor 130 and the GPS unit 154, specifically the compass unit 156, such that it provides current orientation information of the vision-assist system 100 to the processor 130.

Figure 4:
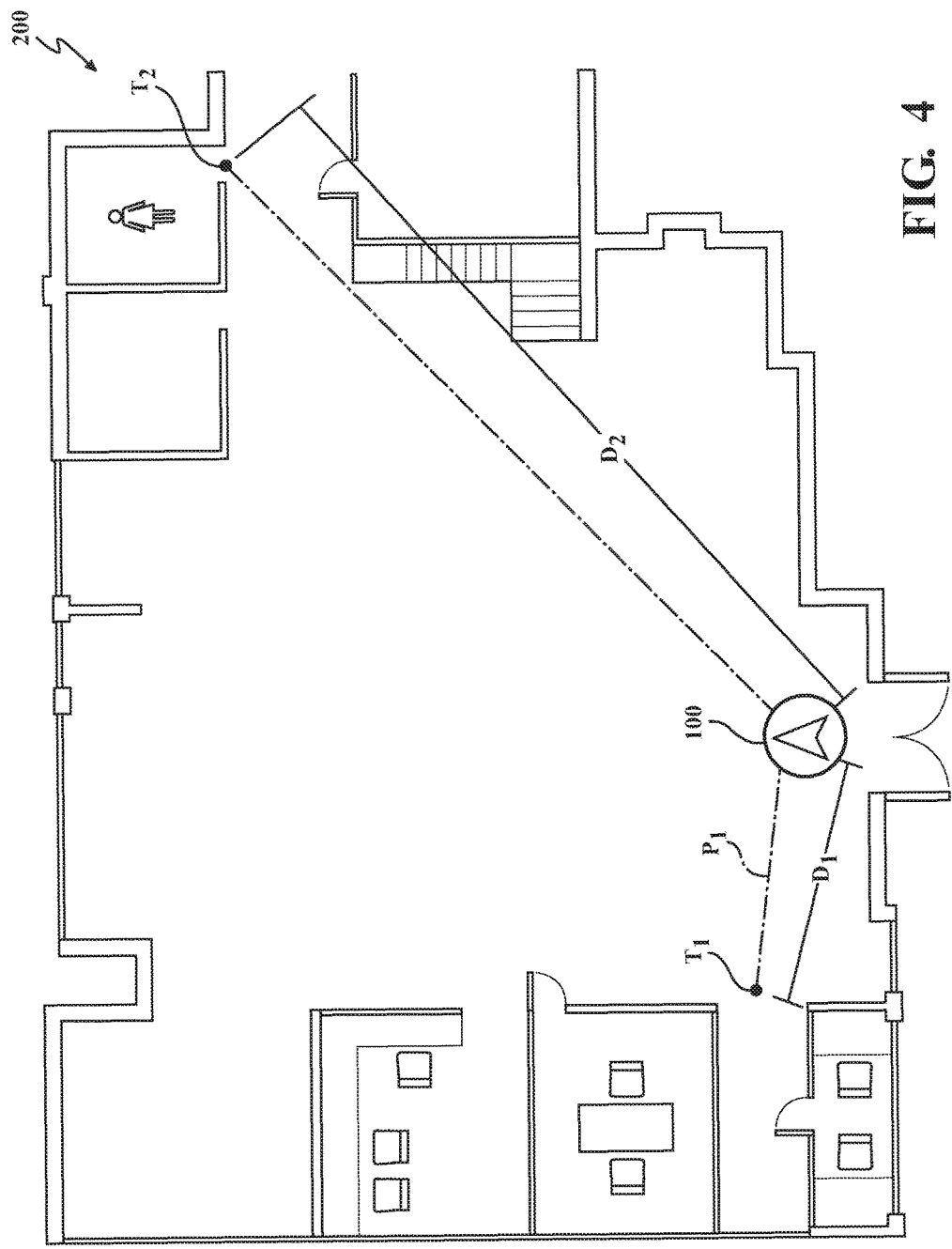
FIG. 4 schematically depicts an example environment where a user may navigate, according to one or more embodiments shown and described herein.

The image sensor 160 is configured to capture image data of an environment 200, as shown in FIG. 4, in which the vision-assist system 100 operates. Referring back to FIG. 1, the image data digitally represents the environment in which the vision-assist system 100 operates, such as objects and locations within the environment. In some embodiments, the image data is used to create local map data utilized by the GPS unit 154 to determine the current location of the user. In some further embodiments, the image data is used in conjunction with the compass unit 156 and/or the inertial measurement unit 158 to determine the current orientation of the user.

The image sensor 160 may be configured as any sensor operable to capture image data, such as, without limitation, a charged-coupled device image sensors or complementary metal-oxide-semiconductor sensors capable of detecting optical radiation having wavelengths in the visual spectrum, for example. The image sensor 160 may be configured to detect optical radiation in wavelengths outside of the visual spectrum, such as wavelengths within the infrared spectrum. In some embodiments, two image sensors 160 are provided to create stereo image data capable of capturing depth information.

The GPS unit 154, the compass unit 156, the inertial measurement unit 158 and the image sensor 160 operate as a location sensor of the vision-assist system 100. The location sensor is configured to determine or detect a current location of the user and a current orientation of the user. In some embodiments, one of the GPS unit 154, the compass unit 156, the inertial measurement unit 158 and the image sensor 160 operates as the location sensor. In some other embodiments, a combination of any of the GPS unit 154, the compass unit 156, the inertial measurement unit 158 and the image sensor 160 operates as the location sensor. In some embodiments, the location sensor is configured to detect a signal indicating the current location and current orientation of the user and the processor 130 executes logic, as described below, to determine the current location and the current orientation of the user.

The one or more user input unit 162 are provided for the user to communicate with the vision-assist system 100. The user input device 162 may be used by the user to complete tasks such as program preferences or settings, provide commands, and provide feedback to the vision-assist system 100. The user input unit 162 may take on any appropriate form. For example, the user input unit 162 may be configured as a keyboard, buttons, switches, touch-sensitive pads, microphones, and the like. Any appropriate user input device may be utilized. As described in more detail below, the user input unit 162 may be used by the user to set target destinations such as a first target destination and a second target destination.

The memory component 140 stores location/orientation detection logic 140A, navigational path determination logic 140B, navigational path correction logic 140C, audio characteristic variation logic 140D, and audio mixer control logic 140E. The location/orientation detection logic 140A, navigational path determination logic 140B, navigational path correction logic 140C, audio characteristic variation logic 140D, and audio mixer control logic 140E may each include a plurality of different pieces of logic, each of which may be embodied as a computer program, firmware, and/or software/hardware.

It should be understood that the vision-assist system 100 may include additional components not illustrated in FIG. 1, such as a power source, voltage regulators, analog-to-digital converters, digital-to-analog converters, drivers, signal conditioning circuits, electromagnetic filtering circuits, and the like.

Figure 2:
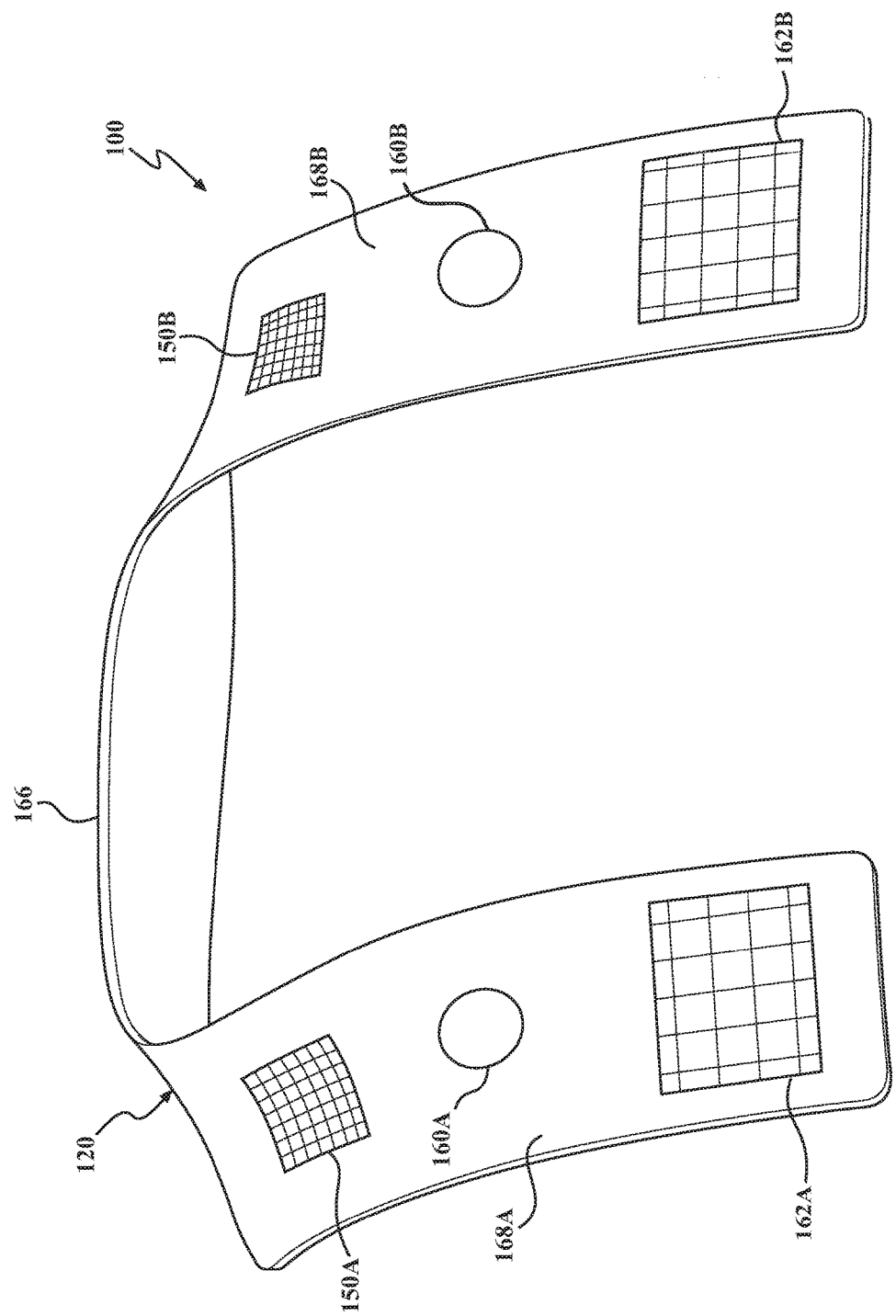
FIG. 2 schematically depicts an example vision-assist system configured to be worn around the neck of a user, according to one or more embodiments shown and described herein.
Figure 3:
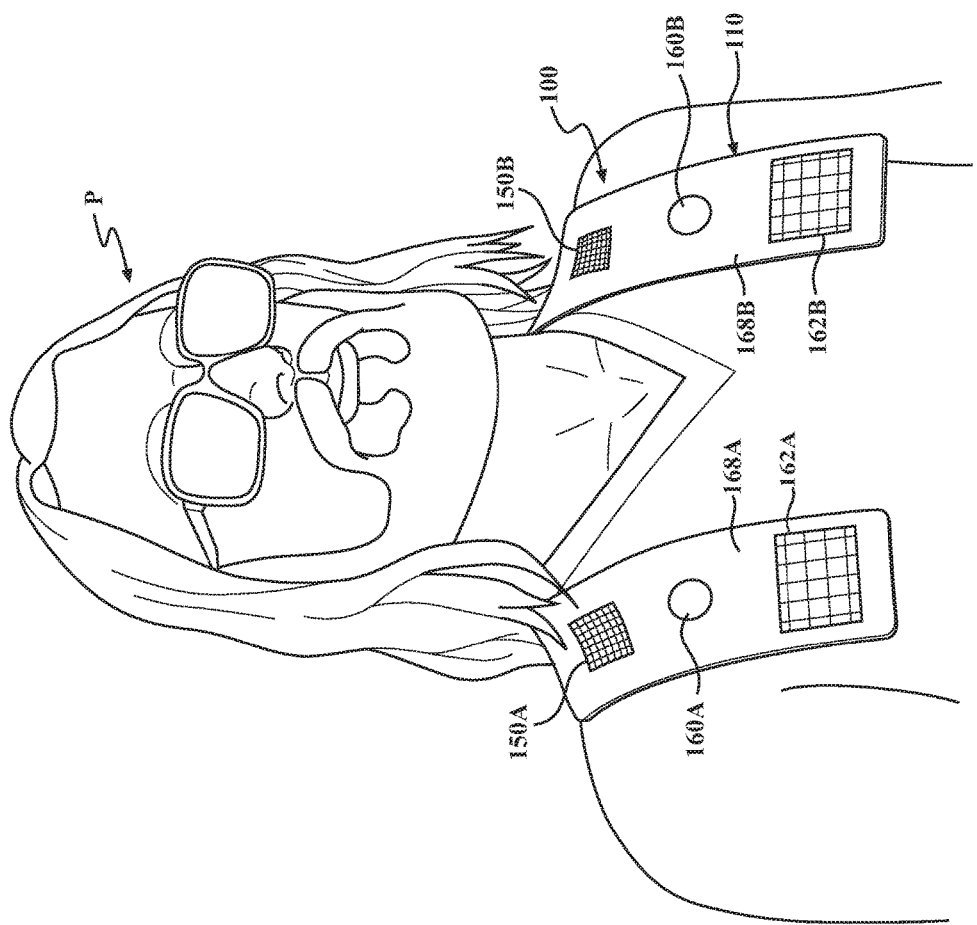
FIG. 3 schematically depicts the example vision-assist system of FIG. 2 as worn by a user, according to one or more embodiments shown and described herein.

Referring now to FIGS. 2 and 3, a non-limiting, example vision-assist system 100 is schematically illustrated as a wearable article that can be worn by a user while navigating (e.g. walking, jogging, etc.) through an environment. FIG. 2 illustrates the example vision-assist system 100 without a user, while FIG. 3 illustrates the example vision-assist device of FIG. 2 worn by a user P.

Referring generally to both FIGS. 2 and 3, the example vision-assist system 100 has a necklace or shawl configuration intended to be worn around the neck of the user P. The housing 110 of the vision-assist system 100 defines a neck portion 166, a first chest portion 168A, and a second chest portion 168B. It should be understood that the housing 110 may be configured differently than what is illustrated in FIGS. 2 and 3, and that the housing 110 may take on different shapes and sizes in other embodiments. For example, the vision-assist system 100 may be embodied as other wearable articles, such as a jacket, vest, hat, etc.

In some embodiments, the housing 110 is made from a pliable wearable material, such as, without limitation, ethylene-vinyl acetate. In other embodiments, the housing 110 is made from a rigid material.

Referring specifically to FIG. 3, the vision-assist system 100 is configured to be worn around the neck of the user P such that the neck portion 166 contacts, or is in close proximity to, the back of the user's neck. The first chest portion 168A and the second chest portion 168B are draped over the user's chest.

In the illustrated example of FIGS. 2 and 3, the first chest portion 168A includes the first audio output unit 150A, a first image sensor 160A, and a first user input unit 162A configured as a touch-sensitive pad or a plurality of mechanical buttons. Similarly, the second chest portion 168B includes the second audio output unit 150B, a second image sensor 160B, and a second user input unit 162B.

It should be understood that the arrangement of the various components within the housing 110 of the example vision-assist system 100 depicted in FIGS. 2 and 3 are for illustrative purposes only, and that more or fewer components may be provided, or arranged in a manner that is different from the arrangement depicted in FIGS. 2 and 3. As a non-limiting, alternative arrangement, only one of the first chest portion 168A or the second chest portion 168B may include a user-input device, for example. In other embodiments, the first audio output unit 150A and second audio output unit 150B are not disposed within the housing 110, but rather are configured as headphones worn by the user. The first audio output unit 150A and the second audio output unit 150B produce auditory messages that are intended to be received by the user P.

The first image sensor 160A and the second image sensor 160B are configured to capture image data to produce three-dimensional images of the scene as the user navigates the environment that are used by the object recognition algorithm(s) to detect objects, locations and people, as described in detail below. As shown in FIG. 3, the first image sensor 160A and the second image sensor 160B are disposed with the first chest portions 166A and the second chest portion 168B such that they are forward-facing and capture image data of the environment 200 directly in front of the user. In other embodiments, one or more additional image sensors may be disposed within the housing 110 to provide image data in directions other than in front of the user P, such as to the right, left and/or rear of the user.

With reference to FIG. 1, the electronic control unit 120 including the processor 130 and the memory component 140 will now be discussed.

The location/orientation detection logic 140A is executable by the processor 130 to detect the current location of the user (i.e. the vision-assist system 100) and the current orientation of the user (i.e. the vision-assist system 100). The location/orientation detection logic 140A is configured to cause the processor 130 to receive outputs from at least one of the GPS unit 154, the compass unit 156, the inertial measurement unit 158 and the image sensor 160. Based on the outputs of at least one of the GPS unit 154, the compass unit 156, the inertial measurement unit 158 and the image sensor 160, the location/orientation detection logic 140A, executed by the processor 130, detects or determines the current location and current orientation of the user P.

The navigational path determination logic 140B is executable by the processor 130 to determine a first navigational path from the current location of the user P to the first target destination. The navigational path determination logic 140B is executable by the processor 130 to also determine a second navigational path from the current location of the user P to the second target destination. The first and second target destinations are set by the user P. In some embodiments, the first and second target destinations are set by the user P using the user input unit 162. The navigational path determination logic 140B is executable by the processor 130 to determine a distance between the current location of the user and the first target destination. The navigational path determination logic 140B is executable by the processor 130 to also determine a distance between the current location of the user and the second target destination.

The navigational path correction logic 140C is executable by the processor 130 to determine a first orientation correction required to align the current orientation of the user with the first navigational path. The first orientation correction corresponds to the deviation between the current orientation of the user and the first navigational path.

The navigational path correction logic 140C is executable by the processor 130 to also determine a second orientation correction required to align the current orientation of the user with the second navigational path. The second orientation correction corresponds to the deviation between the current orientation of the user and the second navigational path.

The audio characteristic variation logic 140D is executable by the processor 130 to determine a first audio output as directional information to direct the user P to the first target destination along the first navigational path. The audio characteristic variation logic 140D is executable by the processor 130 to also determine a second audio output as directional information to direct the user P to the second target destination along the second navigational path.

The audio characteristic variation logic 140D is further executable by the processor 130 to determine a first variation in an audio characteristic of the first audio output that corresponds to the first orientation correction required to align the current orientation of the user with the first navigational path. The audio characteristic variation logic 140D is further executable by the processor 130 to also determine a second variation in an audio characteristic of the second audio output that corresponds to the second orientation correction required to align the current orientation of the user with the second navigational path.

The first and second audio outputs are provided as directional information to the user in the form of an auditory signal. In some embodiments, the first and second audio outputs are provided as different audio outputs. In some embodiments, the first audio output is provided as a first pitch or tone and the second audio output is provided as a second pitch or tone that is different from the first pitch or tone. The first and second pitches or tone may be configured as a first musical note and a second musical note, respectively. In some other embodiments, the first audio output and the second audio output are a series of musical notes or other series of tones.

In some embodiments, the first and second audio outputs are provided as a distinct sounds. For illustrative purposes only, the first audio output is may be provided as a dog barking and the second audio output may be provided as a cat meowing. In some embodiments the first and second audio outputs are provided as birds chirping, crickets, owls hooting or other animal or non-animal sounds.

The audio mixer control logic 140E is executable by the processor 130 to simultaneously output the first and second audio outputs. Specifically, the audio mixer control logic 140E is executable by the processor 130 to control the audio mixer 152 to control the first and second audio outputs units 150A, 150B to simultaneously output the first and second audio outputs.

In some embodiments, the audio mixer control logic 140E is executable by the processor 130 to have the audio mixer 152 individually vary the audio characteristics of the first audio output and the second audio output based on the first variation and the second variation, respectively, determined by the audio characteristic variation logic 140D. In some embodiments, the first and second variations of the audio characteristics of the first and second audio outputs is a variation in a frequency or amplitude. Specifically, the audio mixer 152 is controlled by the audio mixer control logic 140E to vary the frequency or amplitude of the first and second audio outputs based on the first and second variations, respectively.

By varying the frequency or amplitude of the first and second audio outputs output by the first and second audio output units 150A, 150B, the audio mixer 152 can direct the user's P attention to the individual first and second audio outputs that are outputted simultaneously in stereo using the first and second audio output units 150A, 150B.

In some embodiments, the audio mixer 152 varies the frequency or tone of the first and second audio outputs to correspond to a position across a stereo state using the first and second audio output units 150A, 150B.

In some embodiments, the audio mixer control logic 140E controls the audio mixer 152 to vary the audio characteristics of the first and second audio outputs using spatialized audio. Specifically, the audio mixer control logic 140E controls the audio mixer 152 to modify the first and second audio outputs apparent position in space relative to the user P using Head-Related Transfer function. In the Head-Related Transfer function, the audio mixer control logic 140E takes into account a shadowing of tonal elements by the head, shoulders, an pinna of the ear of the user as well as amplitude related to distance.

Any known or yet-to-be-developed audio characteristic variation algorithms may be utilized to vary the audio characteristic, such as frequency or amplitude, based on a deviation between the current location of the user and the first and second navigational paths.

The audio mixer 152 is controlled by the audio mixer control logic 140E to individually vary a volume of the first audio output and the second audio output. Specifically, a distance between the current location of the user and the first target destination and the second target destination is determined. The audio mixer 152 is controlled by the audio mixer control logic 140E to vary the volume of the first audio output based on the distance between the current location of the user and first target destination. Similarly, the audio mixer 152 is controlled by the audio mixer control logic 140E to vary the volume of the second audio output based on the distance between the current location of the user and second target destination.

In some embodiments, the audio mixer 152 controls the volume of the first audio output such that the volume increases as the distance between the current location of the user and the first target destination decreases. Similarly, the audio mixer 152 controls the volume of the second audio output such that the volume increases as the distance between the current location of the user and the second target destination decreases.

In other embodiments, the audio mixer 152 controls the volume of the first audio output such that the volume decreases as the distance between the current location of the user and the first target destination decreases. Similarly, the audio mixer 152 controls the volume of the second audio output such that the volume decreases as the distance between the current location of the user and the second target destination decreases.

Any known or yet-to-be-developed volume variation algorithms may be utilized to vary the volume of the first and second audio outputs based on a distance between the current location of the user and the first and second target destinations.

Operation of a vision-assist system 100 will now be described. The environment 200 in which the user may navigate is depicted in FIG. 4. In the environment 200, the user may input a first target destination $T_1$ and a second target destination $T_2$. The vision-assist system 100 provides the user with a first navigational path $P_1$ and a second navigational path $P_2$ to the first target destination $T_1$ and the second target destination $T_2$, respectively. In the illustrated embodiment, the first target destination $T_1$ is a hallway and the second target destination $T_2$ is an entrance to a restroom. The first navigational path $P_1$ and the second navigational path $P_2$ are provided as straight pathways. In some embodiments, the first navigational path $P_1$ and the second navigational path $P_2$ are provided with multiple nodes to bypass difficult to navigate area or objects blocking a direct path.

The vision-assist system 100 further determines a distance between the current location of the user and the target destinations. Specifically, the processor 130 executes the navigational path determination logic 140B to determine a distance $D_1$ between the current location of the user and the first target destination $T_1$. Similarly the processor 130 executes the navigational path determination logic 140B to determine a distance $D_2$ between the current location of the user and the second target destination $T_2$.

The vision-assist system 100 provides the user with directional information in the form of a simultaneously outputted first audio output and second audio output. The first audio output is associated with the first navigational path and the second audio output is associated with the second navigational path. As will be described in greater detail below, the vision-assist system 100 continuously varies an audio characteristic of the first and second audio outputs individually based on the relationship between the current orientation of the user and the first and second navigational paths $P_1$, $P_2$.

The simultaneously output of the first and second audio outputs allows the user to navigate to one of the first and second target destinations while maintaining positional awareness of the current location of the user with respect to the other of the first and second target destinations. The continuously variation of the audio characteristic of the first and second audio outputs allows the vision-assist system 100 to provide directional information that keeps up with the natural movement speed of the user. Specifically, the continuously variation of the first and second audio output allows the vision-assist system 100 to provide the user with substantially real-time directional information as the directional information can be varied in substantially real-time with the movements of the user.

Figure 5A:
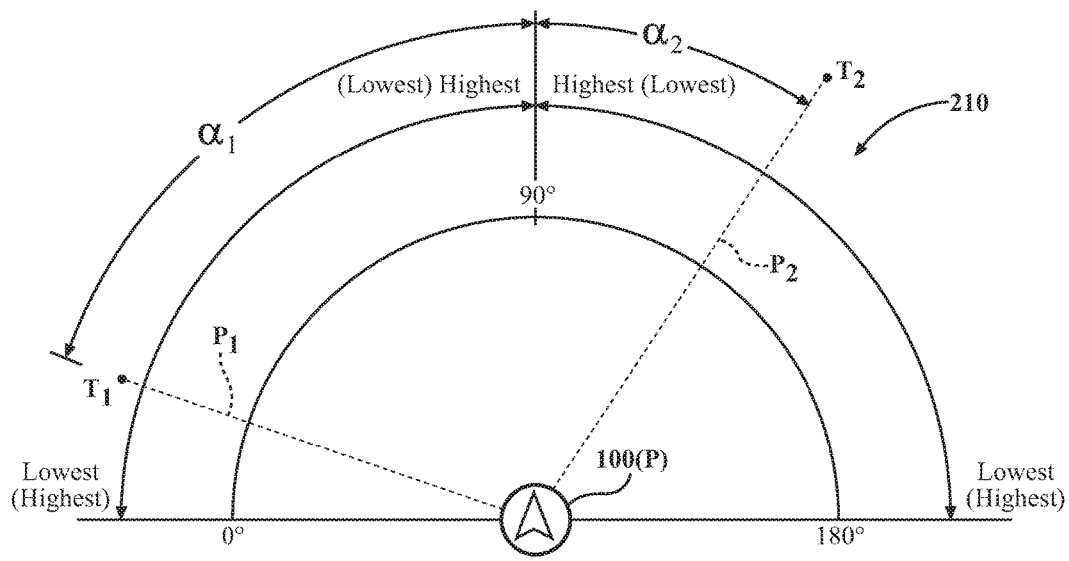
FIG. 5A schematically depicts audio characteristic map data indicating a variation of an audio characteristic of a first audio output in relation to a current orientation of the user with respect to a first navigational path and a variation of an audio characteristic of a second audio output in relation to a current orientation of the user with respect to a second navigational path, according to one or more embodiments shown and described herein.

With reference to FIG. 5A, the audio mixer 152 is controlled by audio mixer control logic 140E to increase a frequency of the audio outputs as a deviation between the current orientation of the user and the navigational paths decreases based on audio characteristic map data 210. Specifically, the audio mixer 152 is controlled by audio mixer control logic 140E to increase a frequency of the first audio output as a deviation between the current orientation of the user and the first navigational path decreases. Similarly, the audio mixer 152 is controlled by audio mixer control logic 140E to increase a frequency of the second audio output as a deviation between the current orientation of the user and the second navigational path decreased. As such, an orientation that corresponds to a twelve o'clock orientation of the user is provided with the highest frequency and any deviation on either side decreases the frequency to the lowest frequency provided at a three o'clock orientation and a nine o'clock orientation.

Still referring to FIG. 5A, the audio mixer 152 may be alternatively controlled by audio mixer control logic 140E to decrease a frequency of the audio outputs as a deviation between the current orientation of the user and the navigational paths decreases based on the audio characteristic map data 210. Specifically, the audio mixer 152 is controlled by audio mixer control logic 140E to decrease a frequency of the first audio output as a deviation between the current orientation of the user and the first navigational path decreases. Similarly, the audio mixer 152 is controlled by audio mixer control logic 140E to decrease a frequency of the second audio output as a deviation between the current orientation of the user and the second navigational path decreased. As such, an orientation that corresponds to a twelve o'clock orientation of the user is provided with the lowest frequency and any deviation on either side increases the frequency to the highest frequency provided at a three o'clock orientation and a nine o'clock orientation.

In the illustrated embodiment of FIG. 5A, the first navigational path $P_1$ deviates from the current orientation of the user by the first deviation $\alpha_1$. Similarly, the second navigational path $P_2$ deviates from the current orientation of the user by the second deviation $\alpha_2$. The first deviation at and the second deviation $\alpha_2$ are determined by the navigational path correction logic 140C executed by the processor. The audio characteristics of the first and second audio outputs are varied by the audio characteristic variation logic 140D and the audio mixer control logic 140E, executed by the processor 130, based on the first deviation $\alpha_1$ and the second deviation $\alpha_2$.

In the embodiment of FIG. 5A, in which the highest frequency corresponds to the twelve o'clock orientation of the user, the frequency of the first audio output is lower than the frequency of the second audio output. Similarly, in the embodiment of FIG. 5A in which the lowest frequency corresponds to the twelve o'clock orientation of the user, the frequency of the first audio output is greater than the frequency of the second audio output.

Figure 5B:
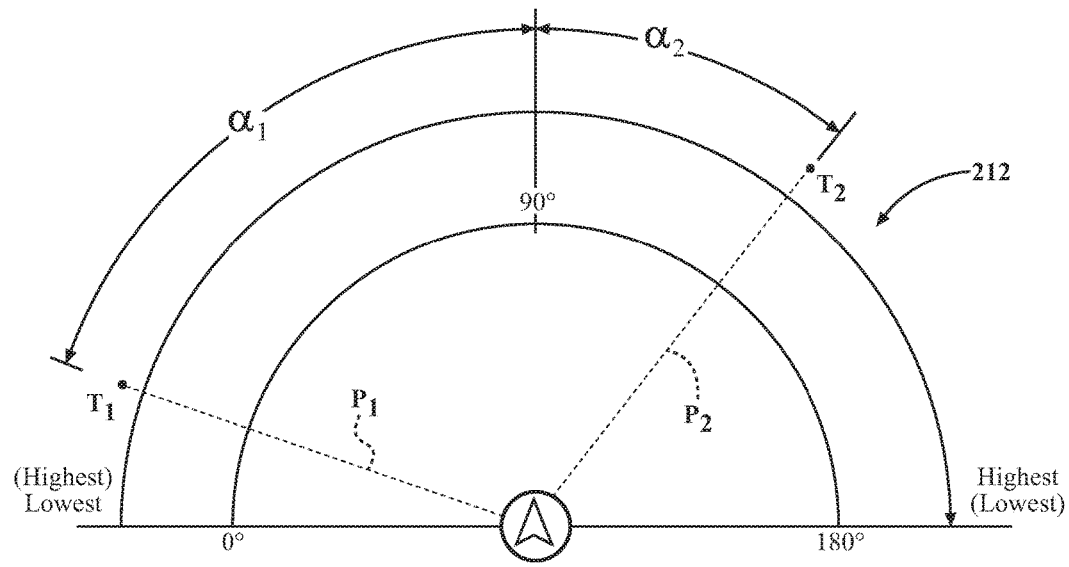
FIG. 5B schematically depicts alternative audio characteristic map data indicating a variation of an audio characteristic of a first audio output in relation to a current orientation of the user with respect to a first navigational path and an alternative variation of an audio characteristic of a second audio output in relation to a current orientation of the user with respect to a second navigational path, according to one or more embodiments shown and described herein.

With reference to FIG. 5B, the audio mixer 152 is controlled by audio mixer control logic 140E to vary the audio characteristics based on the first and second deviations using a sliding scale based on audio characteristic map data 212. Specifically, the variation of the audio characteristic would be based on a location of the first and second navigational paths, relative to the current orientation of the user, on a map in which a lowest (or highest) variation is positioned at the user's three o'clock and the highest (or lowest) variation is positioned at the user's nine o'clock.

The audio characteristic map data 210, 212 is stored in the memory component 140 and is used by the audio characteristic variation logic 140D to vary the first and second audio outputs based on the first and second deviations $\alpha_1$, $\alpha_2$, which are determined by the processor 130 executing the navigational path correction logic 140C.

In the embodiment of FIG. 5B, in which the lowest frequency corresponds to the three o'clock orientation of the user, the frequency of the first audio output is lower than the frequency of the second audio output. Similarly, in the embodiment of FIG. 5B, in which the highest frequency corresponds to the three o'clock orientation of the user, the frequency of the first audio output is greater than the frequency of the second audio output.

Figure 6:
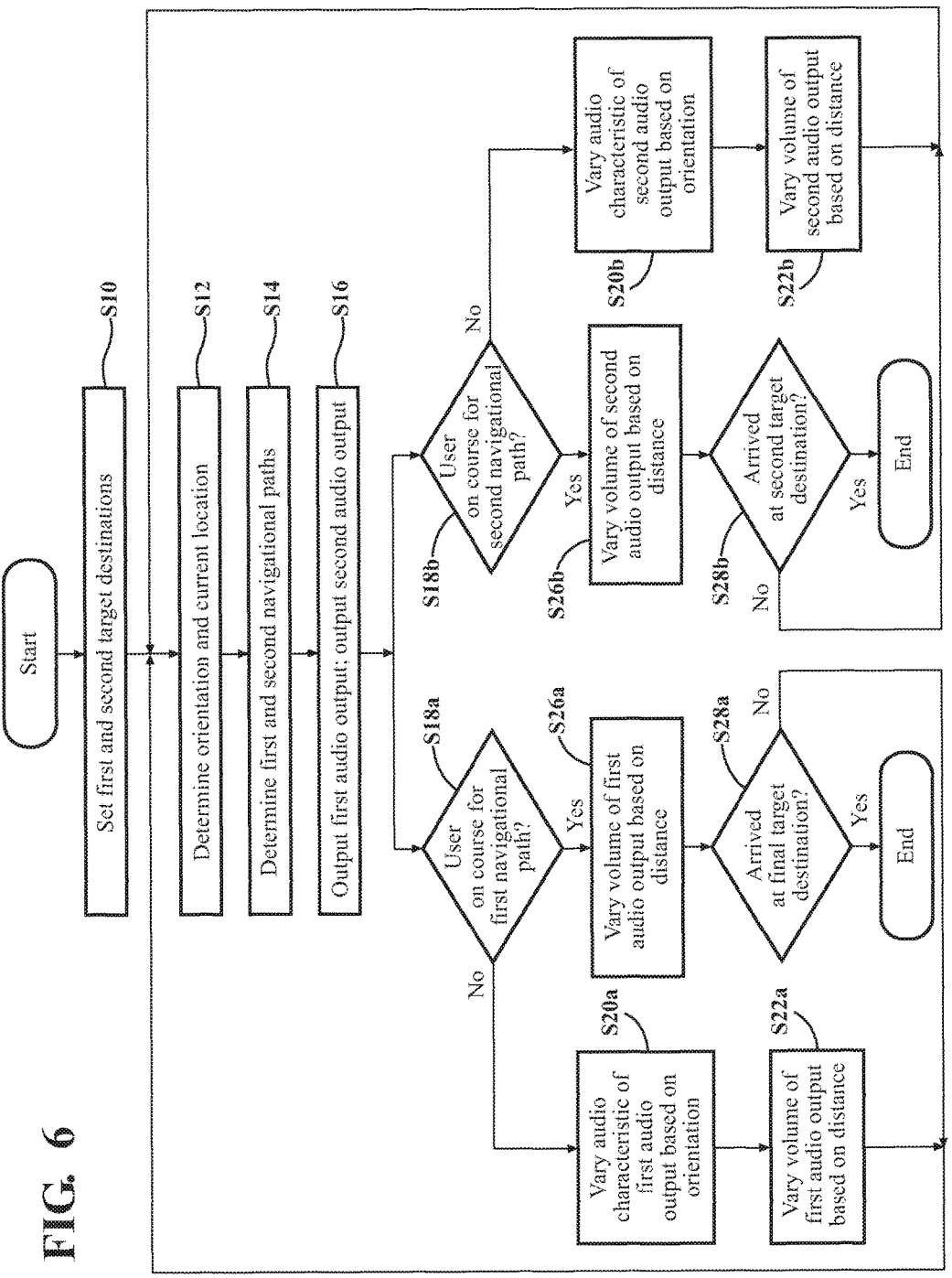
FIG. 6 depicts a flowchart for facilitating assistance for a visually impaired user with navigating an environment, according to one or more embodiments shown and described herein.

FIG. 6 depicts a flowchart of an example of a vision-assist process executed by the processor 130 for assisting a visually impaired user with navigating an environment. The flowchart depicted in FIG. 6 is executed by the logic stored in the memory component 140 that is executed by the processor 130 in the electronic control unit 120. The steps of flowchart of FIG. 6 may be repeated until the vision-assist system 100 navigates the user to one or more of the first and second target destinations.

In step S10 of FIG. 6, the user sets a first target destination $T_1$ and a second target destination $T_2$. Specifically, the user operates one of the first and second user input units 162A, 162B to entire the first and second target destinations $T_1$, $T_2$.

The process proceeds to step S12 in which the current orientation and the current location of the user is determined. Specifically, the processor 130 executes the location/orientation detection logic 140A, based on outputs from at least one of the GPS unit 154, the compass unit 156, the inertial measurement unit 158 and the image sensor 160, the location/orientation detection logic 140A, to detect or determine the current location and current orientation of the user P.

The process proceeds to step S14 in which the first and second navigational paths $P_1$, $P_2$ are determined based on the current location and current orientation of the user and the set first and second target destinations $T_1$, $T_2$. Specifically, the processor 130 executes the navigational path determination logic 140B to determine, in conjunction with the GPS unit 154, the first and second navigational paths $P_1$, $P_2$.

The process proceeds to step S16 in which the first and second audio output units 150A, 150B are controlled by the processor 130 to simultaneously output the directional information in the form of the first audio output and the second audio output. The first audio output is associated with the first navigational path $P_1$ and the second audio output is associated with the second navigational path $P_2$. The processor 130 executes the audio mixer control logic 140E to continuously output the first audio and the second audio output to provide substantially real-time updates to the directional information.

The process proceeds to execute steps S18A-S28A concurrently with steps S18B-S28B.

In step S18A and S18B, the processor 130 determines whether the user is on course for the first and second navigational paths $P_1$, $P_2$, respectively. The processor 130 determines whether the user is on course for the first and second navigational paths $P_1$, $P_2$ based on the first and second deviations $\alpha_1$ and $\alpha_2$, determined by executing the navigational path correction logic 140C. Specifically, if the first and second deviations $\alpha_1$ and $\alpha_2$ are equal to zero, then the processor 130 determines that the user is on course for the first and second navigational paths $P_1$, $P_2$, respectively.

It is appreciated, that a determination that the user is on course for the first and second navigational paths P1, P2 when the first and second deviations $\alpha_1$ and $\alpha_2$ are equal to a predetermined threshold range. The first and second deviations are $\alpha_1$ and $\alpha_2$ determined as the angle formed between the current orientation of the user 90° (i.e. twelve o'clock orientation) and the first and second navigational paths $P_1$, $P_2$, respectively. For example, the predetermined threshold range may be 87° to 93°±2°.

Upon a NO determination in steps S18A and S18B, the process proceeds to steps S20A and S20B. In steps S20A and S20B the processor 130 varies the audio characteristics of the first and second audio outputs, respectively, according to the audio characteristic map data 210 or 212 of FIG. 5A or FIG. 5B. Specifically, the processor 130 executes the audio characteristic variation logic 140D based on the audio characteristic map data 210 or 212.

The first audio output is individually varied based on the first deviation $\alpha_1$ and the second audio output is individually varied based on the second deviation $\alpha_2$. The varied first and second audio outputs are simultaneously provided to the user through the first and second audio output units 150A, 150B to simultaneously provide directional information to first target destination $T_1$ and the second target destination $T_2$.

The process then proceeds to steps S22A and S22B, in which the volume of the first and second audio outputs is varied based on a distance between the current location of the user and the first and second target destinations $T_1$, $T_2$, respectively. The processor 130 executes the audio characteristic variation logic 140D to vary the volume of the first and second audio outputs and executes the audio mixer control logic 140E to simultaneously output the varied first and second audio outputs. After completion of steps S22A and S22B, the process returns to step S12 and repeats the subsequent steps with updated current location and current orientation information. By repeating step S12, the vision-assist process provides continuously updated directional information.

Upon a YES determination in steps S18A and S18B, the process proceeds to steps S24A and S24B. In steps S24A and S24B the processor 130 executes the audio characteristic variation logic 140D to vary the volume of the first and second audio outputs and executes the audio mixer control logic 140E to simultaneously output the varied first and second audio outputs. After completion of steps S24A and S24B, the process proceeds to steps S26A and S26B.

In steps S26A and S26B, the processor 130 determines whether the user has reached the first and second target destinations, respectively. Upon a YES determination in both of S26A and S26B the process ends. Upon a NO determination for both of S26A and S26B and the process proceeds back to step S12 to repeat the subsequent steps. Upon a YES determination in one of S26A and S26B and a NO determination for the other of the S26A and S26B, the process ends for the one of S26A and S26B and the process proceeds back to step S12 to repeat the subsequent steps. By repeating step S12, the vision-assist process provides continuously updated directional information.

It should now be understood that embodiments disclosed herein include systems, methods, and nontransitory computer readable mediums for assisting a visually impaired user with navigating an environment. It should also be understood that these embodiments are merely explanatory and are not intended to limit the scope of the disclosure.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. It is therefore intended that the appended claims cover all such changes and modifications that are within the scope of the embodiments shown and described herein.

What is claimed is:

1. A vision-assist system for assisting a visually impaired user with navigating an environment, the system comprising;
    a location sensor configured to detect a current location of the user and a current orientation of the user;
    an audio output unit configured to provide an audio output to the user;
    an electronic control unit operatively connected to the location sensor and the audio output unit, the electronic control unit including a processor and a memory unit coupled to the processor, the memory unit stores logic that, when executed by the processor, causes the electronic control unit to:
    in response to an identification of a first target destination and a second target destination of the user, determine a first navigational path to the first target destination and a second navigational path to the second target destination based on the current location and orientation of the user; and
    provide the user with directional information in the form a first audio output associated with the first target destination and a second audio output associated with the second target destination;
    vary an audio characteristic of the first audio output in relation to the orientation of the user with respect to the first navigational path and vary an audio characteristic of the second audio output in relation to the current orientation of the user with respect to the second navigational path; and
    control the audio output unit to simultaneously output the first audio output and the second audio output.

2. The system of claim 1, wherein the first audio output is different than the second audio output.

3. The system of claim 2, wherein the audio characteristic of the first audio output is a frequency and the electronic control unit continuously varies the frequency of the first audio output based on the current orientation of the user with respect to the first navigational path.

4. The system of claim 3, wherein the audio characteristic of the second audio output is a frequency and the electronic control unit continuously varies the frequency of the second audio output based on the current orientation of the user with respect to the second navigational path.

5. The system of claim 4, wherein the frequency of the first audio output increases as a deviation between the current orientation of the user and the first navigational path decreases, and
    wherein the frequency of the second audio output increases as a deviation between the current orientation of the user and the second navigational path decreases.

6. The system of claim 4, wherein the frequency of the first audio output decreases as a deviation between the current orientation of the user and the first navigational path decreases, and wherein the frequency of the second audio output decreases as a deviation between the current orientation of the user and the second navigational path decreases.

7. The system of claim 4, wherein the first audio output is a first pitch or tone and the second audio output is a second pitch or tone.

8. The system of claim 4, wherein the electronic control unit is configured to vary a volume of the first audio output based a distance between the current location of the user and the first target destination, and vary a volume of the second audio output based a distance between the current location of the and the second target destination.

9. The system of claim 8, wherein the volume of the first audio output increases as the distance between the current location of the user and the first target destination decreases, and
wherein the volume of the second audio output increases as the distance between the current location of the user and the second target destination decreases.

10. The system of claim 1, wherein the location sensor is a GPS unit configured to determine the current location of the user and the current orientation of the user.

11. A method for assisting a visually impaired user with navigating an environment, the method comprising a step of:
determining a current location of the user and an orientation of the user;
setting a first target destination and a second target destination of the user;
determining a first navigational path to the first target destination and a second navigational path to the second target destination; and
providing the user with directional information in the form a first audio output associated with the first target destination and a second audio output associated with the second target destination;
varying an audio characteristic of the first audio output in relation to the current orientation of the user with respect to the first navigational path and varying an audio characteristic of the second audio output in relation to the current orientation of the user with respect to the second navigational path; and
outputting the first audio output and the second audio output simultaneously.

12. The method of claim 11, wherein the first audio output is different than the second audio output.

13. The method of claim 12, wherein the audio characteristic of the first audio output is a frequency, and the frequency of the first audio output is continuously varied based on the current orientation of the user with respect to the first navigational path.

14. The method of claim 13, wherein the audio characteristic of the second audio output is a frequency, and the frequency of the second audio output is continuously varied based on the current orientation of the user with respect to the second navigational path.

15. The method of claim 14, wherein the frequency of the first audio output increases as a deviation between the current orientation of the user and the first navigational path decreases, and
wherein the frequency of the second audio output increases as a deviation between the current orientation of the user and the second navigational path decreases.

16. The method of claim 14, wherein the frequency of the first audio output decreases as a deviation between the current orientation of the user and the first navigational path decreases, and
wherein the frequency of the second audio output decreases as a deviation between the current orientation of the user and the second navigational path decreases.

17. The method of claim 14, wherein the first audio output is a first pitch or tone and the second audio output is a second pitch or tone.

18. The method of claim 14 further comprising:
varying a volume of the first audio output based a distance between the current location of the user and the first target destination; and
varying a volume of the second audio output based a distance between the current location of the and the second target destination.

19. The method of claim 18, wherein the volume of the first audio output increases as the distance between the current location of the user and the first target destination decreases, and
wherein the volume of the second audio output increases as the distance between the current location of the user and the second target destination decreases.

20. The method of claim 11 further comprising:
providing a GPS unit to determine the location of the user and the orientation of the user;
providing an audio output unit to output the first audio output and the second audio output to the user; and
providing an electronic control unit operatively connected to the GPS unit and the audio output unit, the electronic control unit including a processor and a memory unit coupled to the processor, the memory unit stores logic that, when executed by the processor, causes the electronic control unit to:
vary the audio characteristic of the first audio output in relation to the orientation of the user with respect to the first navigational path and vary the audio characteristic of the second audio output in relation to the orientation of the user with respect to the second navigational path; and
control the audio output to simultaneously output the first audio output and the second audio output.

* * * * *